United States Patent [19]

Matsumoto

[11] 4,186,706
[45] Feb. 5, 1980

[54] INDUCTION SYSTEM FOR INTERNAL COMBUSTION ENGINE

[75] Inventor: Hiromitsu Matsumoto, Hamamatsu, Japan

[73] Assignee: Yamaha Hatsukoki Kabushiki Kaisha, Iweta, Japan

[21] Appl. No.: 937,711

[22] Filed: Aug. 29, 1978

[30] Foreign Application Priority Data

Sep. 9, 1977 [JP] Japan .................... 52/108490

[51] Int. Cl.² .......................................... F02M 13/06
[52] U.S. Cl. .................... 123/127; 123/75 B; 261/23 A
[58] Field of Search ............ 123/103 R, 127, 122 AB, 123/122 AC, 75 B; 261/23 A, 65 R, 39 A

[56] References Cited

U.S. PATENT DOCUMENTS

| | | | |
|---|---|---|---|
| 3,554,174 | 1/1971 | Clawson | 123/127 |
| 4,002,704 | 1/1977 | Laprade | 261/23 A |
| 4,018,199 | 4/1977 | Furucz | 261/23 A |
| 4,151,820 | 5/1979 | Furucz | 123/127 |

Primary Examiner—Ronald H. Lazarus
Attorney, Agent, or Firm—Ernest A. Beutler

[57] ABSTRACT

Several embodiments of induction systems for internal combustion engines including a relatively large main induction passage and a relatively small sub or auxiliary induction passage. The sub-intake passage is sized so that the charge issuing from it into the combustion chamber enters the chamber at a high velocity to improve flame propagation and combustion. Throttle valves are provided for diverting substantially all of the engines idle and low-speed charge requirements into the chamber through the sub-intake passage. In accordance with each embodiment of the invention, means are provided for causing a small amount of the charge flow during these idle and low-speed conditions also to pass through the main induction passage to minimize the effects of fuel condensation during transition from off-idle to high-speed operation. This arrangement also minimizes the likelihood of lean running during idle and low-speed operation as might also be caused by fuel condensation. In certain embodiments of the invention the flow through the main induction passage is provided by notching or relieving the throttle valve that diverts the flow into the auxiliary or sub-intake passage. In other embodiments of the invention temperature responsive means are provided for permitting the flow through the main intake passage when the temperature of the engine is below a predetermined value.

12 Claims, 6 Drawing Figures

INDUCTION SYSTEM FOR INTERNAL COMBUSTION ENGINE

BACKGROUND OF THE INVENTION

This invention relates to an induction system for an internal combustion engine and more particularly to an induction system that improves running characteristics at idle and low-speed without adversely affecting maximum speed performance of the engine.

It is known that internal combustion engines, particularly those which are called upon to run over a wide range of speed and loads such as an automotive application, have a tendency to run poorly at idle or low-load condition, unless extreme sacrifices are made in high-speed performance. It is also known that the results of this poor performance at light loads is due in large part to the slow-flame speed in the combustion chamber, which results among other things from the low-speed of the intake charge through the engine induction system. It has been proposed to improve slow-speed and idle operation of an engine by providing an auxiliary induction passage through which a substantial portion of the idle and low-speed charge requirements of the engine are provided. This arrangement insures high velocity of the charge entering the combustion chamber and, accordingly, rapid flame propagation and better running under these conditions. This arrangement has been found to both reduce the emissions of unwanted exhaust gas constituents while at the same time permitting an improvement in the fuel economy of the engine under these conditions. In some instances it may also be desirable to direct the sub-intake inlet in such a way so as to establish a swirl in the combustion chamber which is maintained during the compression stroke. Several embodiments of induction systems constructed in accordance with this concept are shown in the copending application for U.S. Letters Patent of Hiromitsu Matsumoto, entitled Control of Carburetor Supplied Induction System, Ser. No. 838,353, filed Sept. 30, 1977 and assigned to the assignee of this invention.

Although the induction systems shown in that patent application significantly improve the low-speed and idle operation of an engine without sacrificing emission control or fuel economy and, in fact, while improving these characteristics, it has been found that in some instances there is a tendency for the engine to run overly lean under idle and off-idle conditions, particularly at low temperatures. This leanness results from the condensation of fuel in the main intake passage at the time the throttle valve which diverts the flow through the auxiliary induction passage is closed.

It is, therefore, a principal object of this invention to provide an improved induction system for an internal combustion engine.

It is another object of the invention to provide an internal combustion engine induction system in which performance under all running conditions is improved.

It is a further object of this invention to provide an induction system for an internal combustion engine including an auxiliary intake system wherein the affects of fuel condensation at low temperatures are minimized.

SUMMARY OF THE INVENTION

This invention is adapted to be embodied in an internal combustion engine having a variable volume chamber in which combustion occurs, a main intake passage communicating with the chamber through a main intake port for delivering a charge thereto and a sub-intake passage communicating with the chamber through a sub-intake port. The sub-intake passage has an effective cross-sectional area at the sub-intake port that is substantially less than the effective cross-sectional area of the main intake port for causing a given mass flow of charge through the sub-intake port to enter the chamber at a substantially greater velocity. A charge forming device is provided for delivering a charge to at least one of the passages and throttle valve means control the ratio of communication of the ports with the chamber during a given cycle of operation of the engine. Throttle valve means is effective to cause substantially all of the idle load charge requirements of the chamber to be supplied through the sub-intake passage and substantially all of the full-load charge requirements of the chamber to be delivered through the main intake passage. In connection with the invention, means are incorporated that provide at least a portion of the idle charge requirements of the chamber through the main intake passage for reducing the effect of fuel condensation in the passages upon mixture strength.

In accordance with certain embodiments of the invention, the means for providing a portion of the idle charge requirements through the main intake passage comprise a relieved portion of the throttle valve which bypasses the throttle valve means and permits flow through the main intake passage.

In connection with other embodiments of the invention, the means for providing the idle charge requirements or a portion of the idle charge requirements through the main intake passage comprise temperature responsive means for controlling the position of the throttle valve means.

DETAILED DESCRIPTION OF THE PREFERRED EMBODIMENTS

Figure 1:
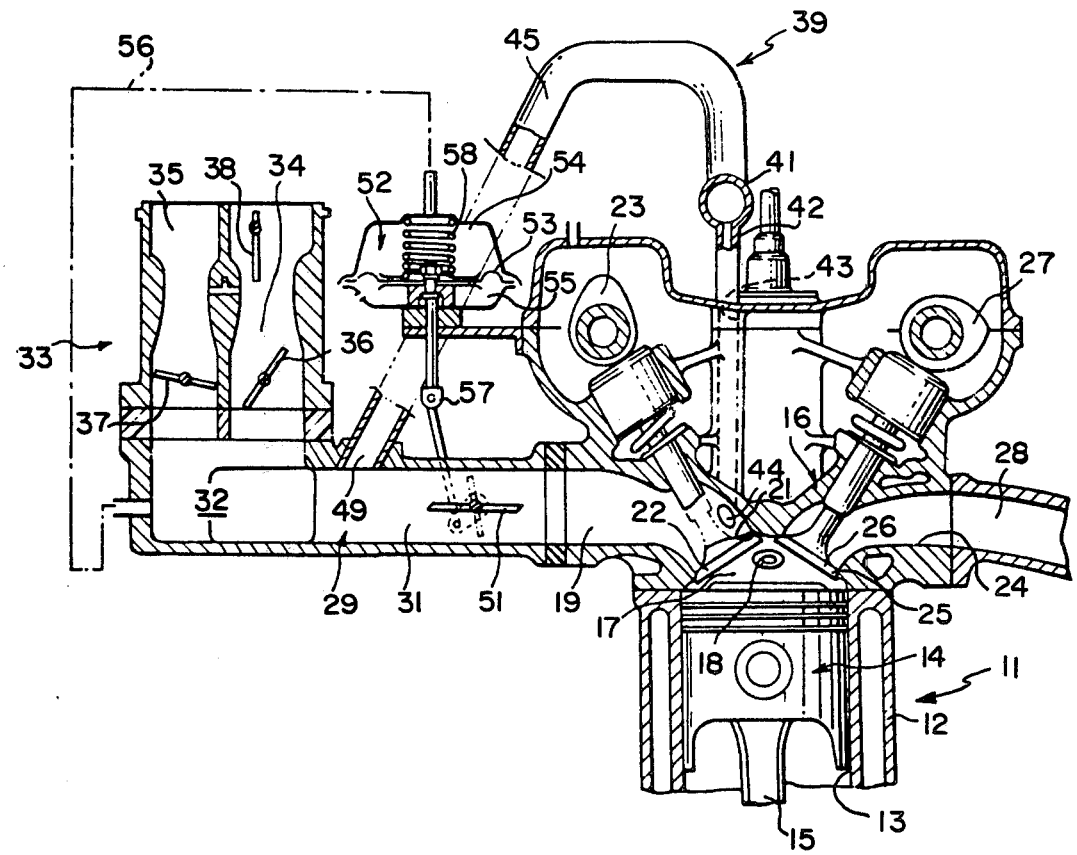
FIG. 1 is a vertical cross-sectional view taken through one cylinder of a multi-cylinder engine constructed in accordance with a first embodiment of the invention and showing portions of the engine in schematic form.
Figure 2:
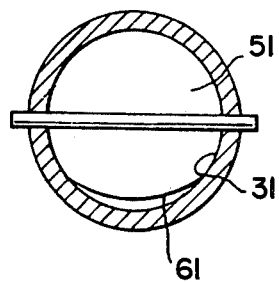
FIG. 2 is an enlarged cross-sectional view taken through the main intake passage in the area of the sub-throttle valve showing a first embodiment of the invention.

Embodiment of FIGS. 1 and 2

An internal combustion engine in accordance with a first embodiment of this invention is identified generally by the reference numeral 11. The engine 11 is comprised of a cylinder block 12 that forms a plurality of cylinder bores 13, only one of which appears in the drawings. Pistons 14 are slidably supported in the respective cylinder bores 13 and drive a crankshaft (not shown) by means of connecting rods 15 in a known manner. A cylinder head 16 is affixed to the cylinder block 12 and defines with the pistons 14 a plurality of combustion chambers 17. Spark plugs 18 are supported in the cylinder head 16 for firing the charge in each of the chambers 17.

The cylinder head 16 is formed with a plurality of inlet passages 19, there being one such passage for each cylinder bore 13. The cylinder head main intake passages 19 terminate in inlet ports 21 and flow through the ports 21 is controlled by a respective inlet valve 22. The inlet valves 22 are driven by means of an inlet camshaft 23.

An exhaust passage 24 is also formed in the cylinder head 16 for each cylinder bore 13. The exhaust passages 24 communicate with the combustion chambers 17 through exhaust ports 25. Exhaust valves 26 control the flow through the exhaust passages 24. An exhaust camshaft 27 is provided that drives the exhaust valves 26 in a known manner. An exhaust manifold 28 is provided for collecting the exhaust gases from the exhaust ports 26 and discharging them via a muffler or the like (not shown).

An intake manifold, indicated generally by the reference numeral 29, is provided for delivering a charge to the combustion chambers 17. The intake manifold 29 has a plurality of main intake passages 31, there being one such passage for each main cylinder head intake passage 19. The manifold intake passages 31 are all served by a common chamber 32 which is positioned beneath and fed by a carburetor, indicated generally by the reference numeral 33.

The carburetor 33 is of the two-stage, two barrel type and includes a primary barrel 34 and a secondary barrel 35. Primary and secondary throttle valves 36 and 37 control the flow through the barrels 34, 35, respectively. The primary throttle valve 36 is adapted to be operated manually by the accelerator pedal of the associated vehicle (not shown) in a known manner while the secondary throttle valve 37 may be operated either automatically depending upon engine load or mechanically in staged sequence with the primary throttle valve 36 or a combination of both, as is well known in this art. As is also well-known, a choke valve 38 is positioned in the primary barrel 34 for providing cold starting enrichment.

The primary and secondary barrels 34, 35 are provided with respective fuel supply systems as are well-known in this art and, for that reason, will not be described in detail. The construction of the engine 11 thus far described is also conventional and, for that reason, more detailed discussion of its structure and operation is not believed to be necessary.

In addition to the primary induction system and in accordance with this invention, the engine 11 is provided with an auxiliary or sub-intake system, indicated generally by the reference numeral 39. The sub-intake system 39 includes a sub-intake manifold 41 having a number of branch pipes 42 equal in number to the number of cylinder bores 13. The branch pipes 42 cooperate with respective sub-intake passages 43 formed in a cylinder head 16 each of which terminates in a sub-intake discharge port 44. The sub-intake discharge port 44 is positioned in the cylinder head main intake passage 19 adjacent to the main intake valve port 21. It will be noted that the angle of discharge in the sub-intake port 44 to the combustion chamber 17 is substantially different from the angle of discharge of the main intake passage 19. If desired, the sub-intake ports 44 may be disposed so that the charge issuing therefrom enters into the combustion chamber 17 in a swirling pattern.

The sub-intake manifold 41 is fed by a pipe 45 that draws its inlet from the intake manifold 29 in the area of the chamber 32 through a port 49.

The sub-inlet system 39 is sized so that its effective cross-sectional area is approximately one-tenth of the effective cross-sectional area of the main intake system. Therefore, a given mass flow of charge flowing into the combustion chamber 17 from the sub-intake ports 44 will enter the chamber 17 at a substantially higher velocity than the charge entering from the main intake passages 19. The ratio of flow to the chamber 17 through the sub-intake system 39 is controlled by a plurality of auxiliary or sub-throttle valves 51 positioned in the intake manifold induction passages 31. The throttle valves 51 have their position controlled by means of a vacuum actuator 52. The vacuum actuator 52 includes a diaphragm 53 that divides the interior of the actuator into an upper chamber 54 and a lower chamber 55. The lower chamber 55 is vented to the atmosphere and the upper chamber 54 communicates with the pressure in the intake manifold 29 between the throttle valves 36 and 37 and the throttle valves 51 by means including a conduit 56. As described in the copending application, the diaphragm 53 of the actuator 52 is connected to the auxiliary throttle valves 51 by means of a linkage system 57. A coil compression spring 58 is positioned in the diaphragm chamber 54 and normally urges the diaphragm 54 in a direction so that the throttle valves 51 will be fully opened.

FIG. 1 illustrates the engine as it appears when running at higher load ranges. Under these conditions, the primary throttle valve 36 of the carburetor 32 will be opened substantially and the intake manifold vacuum in the chamber 32 will be relatively low (pressure high). Therefore, there will be insufficient vacuum generated in the diaphragm 54 to overcome the action of the spring 58 and the auxiliary throttle valves 51 will be held in their fully opened position. Under these conditions, substantially all of the charge requirements of the engine and specifically the chamber 17 will be provided through the manifold main induction passages 31. Some flow will, however, pass through the sub-intake system 39.

When the engine is operating at starting, idle and low-load conditions, there will be a substantial manifold vacuum in the chamber 32 which is transmitted through the conduit 56 to the chamber 54 of the actuator 52. Atmospheric pressure acting in the actuator chamber 55 will then urge the diaphragm 53 upwardly to cause the auxiliary or sub-throttle valves 51 to be moved to a closed position by means of the linkage 57. Under this condition, substantially all of the engine charge requirement will pass through the sub-intake system 39 and enter the chamber 17 at a high velocity due to the small effective cross-sectional area of the sub-intake system 39. Thus, turbulence and/or swirl if desired will be induced in the chambers 19 to cause more rapid and hence smoother combustion. The system is designed so that at idle the auxiliary or sub-throttle valves 51 will be fully closed. It has been found that under this condition there is a tendency for fuel to condense in the chamber 32 and passages 31 of the intake manifold 29. This is particularly prevalent at low temperatures. Thus, the charge flowing through the sub-intake system 39 will tend to be leaner than desired to cause poor running. In order to overcome this situation the auxiliary throttle valves 39 are each formed with a relieved area 61 (FIG. 2). Preferably the area of the relief 61 is approximately equal to one-tenth of the cross-sectional area of the throttle valve 51. Thus, there will be a small amount of the charge requirements of the chamber 17 supplied past the relief 61 through the main induction passages 31. This high velocity flow through the main induction passages 31 will tend to pick up any fuel that might condense or collect in the induction passages 32 and 31 and prevent overleanness in the mixture. The air entering through the main intake passages 19 of the cylinder head 16 will also enter the chamber 17 at a high velocity to further aid in the running characteristics of the engine.

Figure 3:
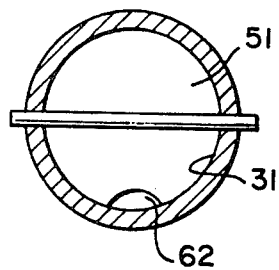
FIG. 3 is a cross-sectional view, in part similar to FIG. 2, showing another embodiment of the invention.

Embodiment of FIG. 3

FIG. 3 is a cross-sectional view, in part similar to FIG. 2, showing another method by which the auxiliary or sub throttle valves 51 may be relieved. Instead of the large arcuate recess of the embodiment of FIGS. 1 and 2, the throttle valves 51 are formed with a small, semicircular cut out 62. As in the previously described embodiment, the area of the cut out 62 is approximately one-tenth of the total area of the auxiliary or sub throttle valves 51.

Figure 4:
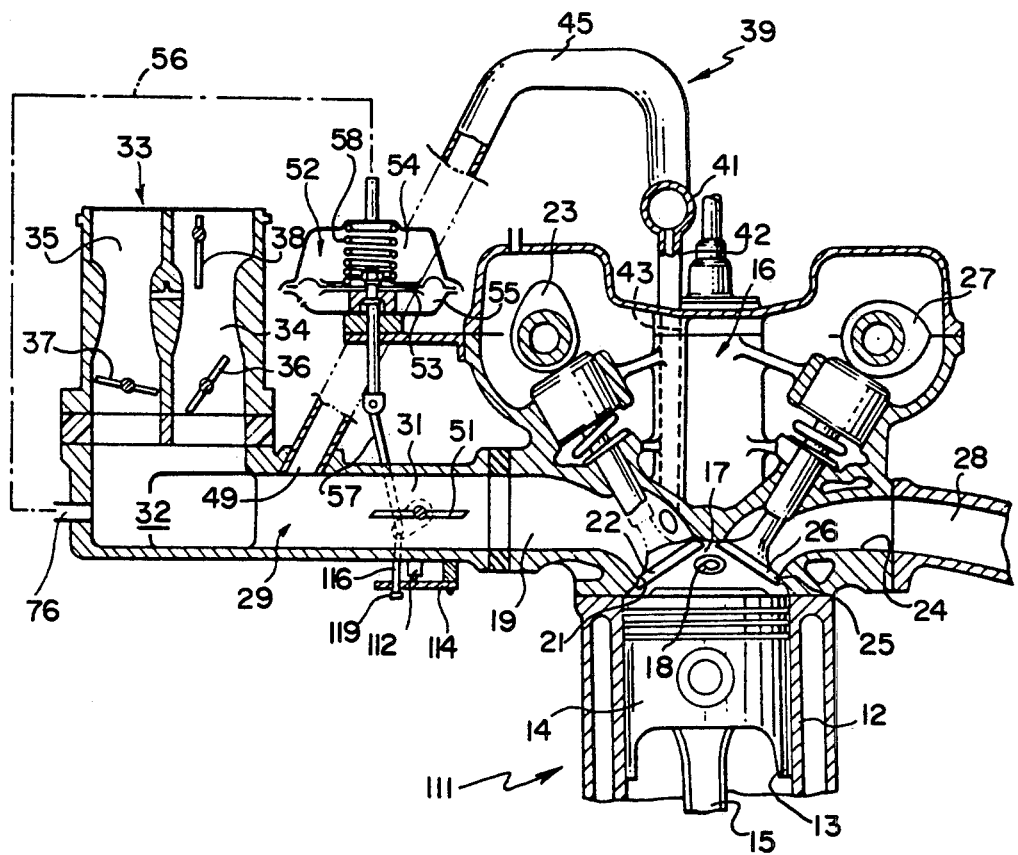
FIG. 4 is a vertical cross-sectional view, in part similar to FIG. 1, showing another embodiment of the invention.
Figure 5:
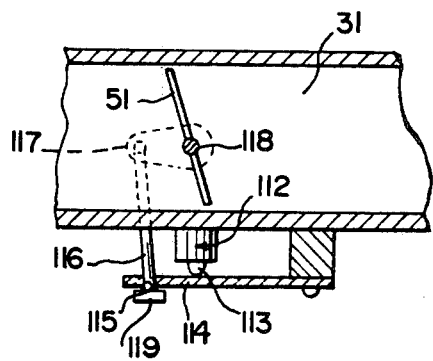
FIG. 5 is an enlarged cross-sectional view, of a portion of the embodiment of FIG. 4, showing the temperature responsive means for controlling the sub-throttle valve.

Embodiment of FIGS. 4 and 5

As has been noted in discussing the previous embodiments, the condensation problem and its effect on the fuel air mixture flowing through the sub-intake system is primarily temperature related. FIGS. 4 and 5 illustrate an embodiment of the invention wherein the auxiliary flow through the primary induction system to offset the condensation problem is controlled by a temperature responsive device.

An engine constructed in accordance with this embodiment of the invention is identified generally by the reference numeral 111. The construction of the main and auxiliary or sub-intake systems and the remainder of the engine 111 is substantially the same as in the previously described embodiments. For this reason, parts which are identical in construction and function have been identified by the same reference numeral and will not be described again.

In connection with this embodiment of the invention, the auxiliary throttle valves 51 are not notched or cut out as in the previously described embodiment. Rather, a temperature responsive device, indicated generally by the reference numeral 112 is provided for partially opening the auxiliary throttle valves 51 under low temperature conditions. The temperature responsive device 112 senses the temperature of the engine, and particularly the temperature of the manifold 29 adjacent the main intake passages 31. Preferably, the temperature responsive device 112 is of the thermal wax pellet type and has an actuating plunger 113 that bears against a cantilevered spring 114. The spring 114 has an enlarged aperature 115 that passes an actuating rod 116 which is, in turn, pivoted to a lever 117 that is fixed to the common actuating shaft 118 of the throttle valves 51. Actuating rod 116 has an enlarged head 119 that is adapted to be engaged by the cantilevered spring 114, in a manner to be described.

It should be readily apparent that the connection between the rod 116 and spring 114 acts in a lost motion manner so that the sub-throttle valves 51 may be moved to their fully opened position without any interference from the spring 114. The spring 114 will, however, control the fully closed position of the sub-throttle valves 51 in response to the temperature sensed by the temperature responsive device 112. Preferably, the temperature responsive device 112 is designed so that it will actuate its plunger 113 and deflect the leaf spring 114 when the temperature of the manifold in the vicinity of the passages 31 is below 15 degrees Centigrade. Under this condition, the rod 116 will be pulled downwardly to slightly open the sub-throttle valves 51. Preferably, the degree of opening will be such that approximately 10 percent of the effective cross-sectional area of the main intake passages 31 is uncovered. Thus, when the temperature responsive device 112 is below 15 degrees Centigrade the sub-throttle valves 51 will be slightly open regardless of the condition of the actuator 52. Said another way, if the actuator 52 is sensing a low enough pressure as to fully close the sub or auxiliary throttle valves 51, the temperature responsive device 112 will prevent this full closure. Therefore, conditions when fuel is likely to condense in the main intake passages 31 and chamber 32 will be compensated for by causing a high velocity airflow to pass through the main induction passages 31 past the partially open sub-throttle valves 51. When the temperature is above 15 degrees Centigrade, this embodiment will function in a normal manner with no partial opening of the sub-throttle valves 51.

Figure 6:
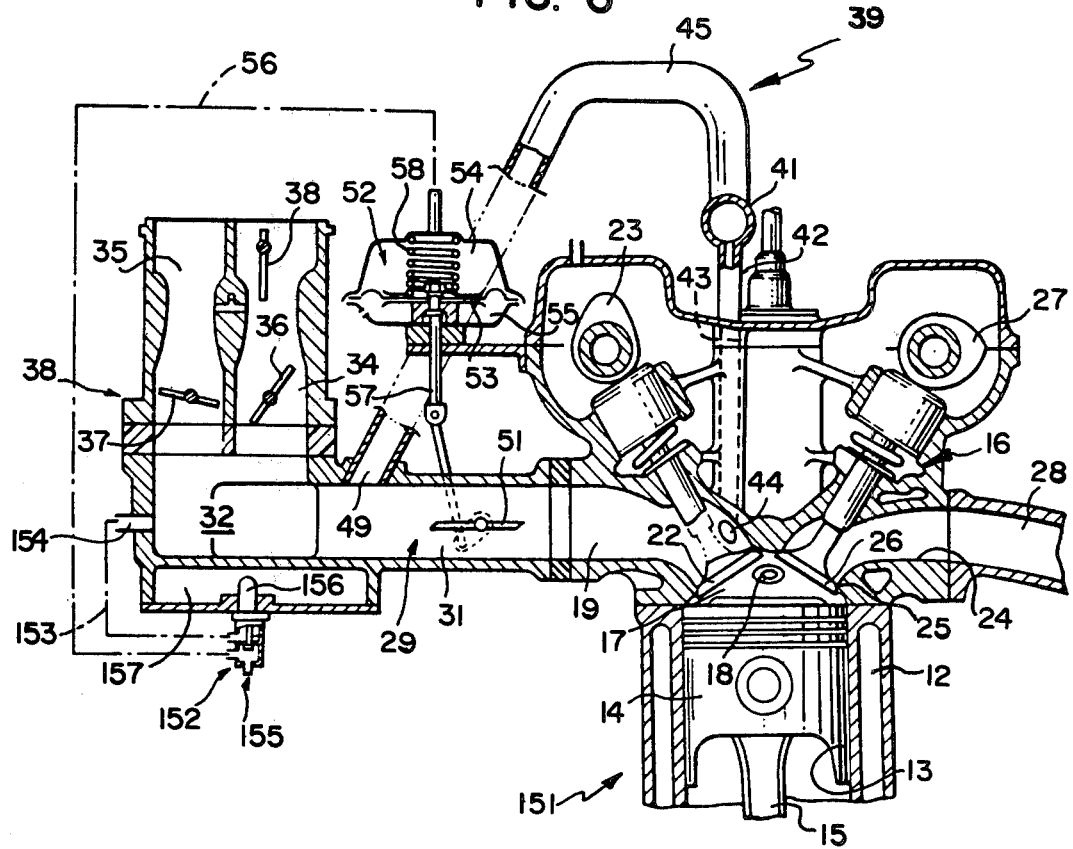
FIG. 6 is a vertical cross-sectional view, in part similar to FIGS. 1 and 4, showing a further embodiment of the invention.

Embodiment of FIG. 6

An engine constructed in accordance with a still further embodiment of this invention is identified generally by the reference numeral 151. The engine 151 is substantially the same as in the preceding embodiments and, for that reason, parts which are identical in structure and function have been identified by the same reference numeral and detailed description of these parts will not be repeated. Like the embodiment of FIGS. 4 and 5, the sub or auxiliary throttle valves 51 are partially opened at low temperatures by a temperature responsive device and, therefore, these throttle valves are not notched as in the embodiment of FIGS. 1, 2 and 3.

In connection with this embodiment, the temperature control for the throttle valves 51 is interposed in the circuit which connects the chamber 54 with the pressure in the induction system between the throttle valves 36 and 37 and the sub-throttle valves 51. For this purpose, the conduit 56 is connected to a temperature responsive valve, indicated generally by the reference numberal 152. The temperature responsive valve 152 is connected to a conduit 153 which in turn extends to a passage 154 which communicates with the intake manifold chamber 32. The temperature responsive valve 152 also has an atmospheric port 155. The valve 152 has a projecting portion 156 that is positioned in heat exchanging relationship with a hot spot 157 of the manifold 29 beneath the chamber 32. As with the temperature responsive device of the preceding embodiment, the valve 152 is controlled by a thermal wax pellet so as to selectively communicate the conduit 56 with either the chamber 32 via the conduit 153 or with the atmosphere via the atmospheric port 155.

The temperature responsive valve 152 is designed so as to operate at a temperature lower than 15 degrees Centigrade. Therefore, when the hot spot 151 is below this temperature the conduit 56 will be placed in communication with the atmospheric port 155 via the temperature responsive valve 152. Therefore, at low-loads, idle and starting atmospheric pressure in the chamber 52 will let the spring 58 cause opening of the auxiliary throttle valves 51. Thus, the condensation problem aforenoted will be precluded by a high velocity airflow through the main induction passages 31.

When the temperature of the hot spot 157 exceeds 15° C., the temperature responsive valve 156 will close the atmospheric port 155 and expose the vacuum motor chamber 54 to the pressure in the intake manifold chamber 32. At low loads this pressure will be low and the atmospheric pressure in the chamber 55 will cause the throttle valve 51 to be moved toward its closed position. This condition occurs during idling, at off idle or when coasting. The charge requirements of the engine 151 will then be delivered to the chambers 19 through the sub or auxiliary induction system 39. At idle or charge load conditions the high velocity in induction will improve turbulence in the chamber 19 at the time of combustion and improve engine running, as aforenoted.

As the load on the engine 151 increases, pressure in the manifold chamber 32 will increase (manifold vacuum decreases) and the throttle valve 51 will be moved toward its opened position by the action of the spring 58 in opposition to the pressure difference between the chambers 55 and 54. Thus, an increasing percentage of the charge for the chambers 19 will be delivered through the main induction system.

It should be readily apparent that each of the described embodiments provides a structure whereby the likelihood of fuel condensation in the intake manifold under low temperatures and at low loads is precluded. In certain embodiments this is provided by a temperature responsive device. Although the invention has been described in conjunction with a carbureted engine, it is to be understood that it has equal applicability with fuel injected engines. Various other changes and modifications may be made without departing from the spirit and scope of the invention, as defined by the appended claims.

What is claimed is:

1. In an internal combustion engine having a variable volume chamber in which combustion occurs, a main intake passage communicating with said chamber through a main intake port for delivering a charge thereto, a sub-intake passage communicating with said chamber through a sub-intake port, said sub-intake passage having an effective cross-sectional area at said sub-intake port substantially less than the effective cross-sectional area of said main intake port for causing a given mass flow of charge through the said sub-intake port to enter the chamber at a substantially greater velocity, a charge forming device for delivering a charge to at least one of said passages, and throttle valve means for controlling the ratio of communication of said ports with said chamber during a given cycle of operation of said engine, said throttle valve means being effective to cause substantially all of the idle load charge requirements of said chamber to be supplied through said sub-intake passage and substantially all of the full load charge requirements of said chamber through said main intake passage, the improvement comprising means for providing at least a portion of the idle charge requirements of said chamber through said main intake passage for reducing the effects of fuel condensation in said passages upon mixture strength.

2. An internal combustion engine as set forth in claim 1 wherein the means for providing a portion of the idle charge requirements through the main intake passage is responsive to temperature for providing a portion of the idle charge requirements through the main intake passage when the temperature is below a predetermined value.

3. An internal combustion engine as set forth in claim 1 wherein the main intake passage and the sub-intake passage have a common inlet, the charge forming device discharging into said common inlet.

4. An internal combustion engine as set forth in claim 3 wherein the means for providing a portion of the idle charge requirements through the main intake passage is responsive to temperature for providing a portion of the idle charge requirements through the main intake passage when the temperature is below a predetermined value.

5. An internal combustion engine as set forth in claim 1 wherein the throttle valve means comprises a main throttle valve and a sub-throttle valve, said sub-throttle valve being operative to control the amount of flow through the sub-intake passage.

6. An internal combustion engine as set forth in claim 5 wherein the means for providing a portion of the idle charge requirements through the main intake passage is responsive to temperature for providing a portion of the idle charge requirements through the main intake passage when the temperature is below a predetermined value.

7. An internal combustion engine as set forth in claim 6 wherein the temperature responsive means is operative to at least partially open the sub-throttle valve when the temperature is below the predetermined value.

8. An internal combustion engine as set forth in claim 5 wherein the means for providing at least a portion of the idle charge requirements through the main intake passage comprises means for at least partially opening the sub-throttle valve, the sub-throttle valve being positioned in the main intake passage for diverting flow through the sub-intake system when said sub-throttle valve is closed.

9. An internal combustion engine as set forth in claim 3 wherein the throttle valve means comprises a primary throttle valve positioned contiguous to the common inlet of the intake passages and a sub-throttle valve positioned in the primary induction passage downstream of the inlet to the sub-intake passage for diverting a portion of the charge flow through the sub-intake passage when said sub-throttle valve is closed, the means for providing a portion of the idle charge requirements through the main intake passage comprising a relief in said sub-throttle valve.

10. An internal combustion engine as set forth in claim 9 wherein the relief comprises approximately ten percent of the cross-sectional area of the sub-throttle valve.

11. An internal combustion engine as set forth in claims 1, 2, 4, 7 or 10 wherein the throttle valve means is responsive to the load of the engine.

12. An internal combustion engine as set forth in claim 11 wherein the load responsive means includes means responsive to the pressure in the primary induction passage.